Oct. 28, 1930.  S. WEIN  1,779,574
DIRECT READING PHOTOMETER
Filed Nov. 8, 1929
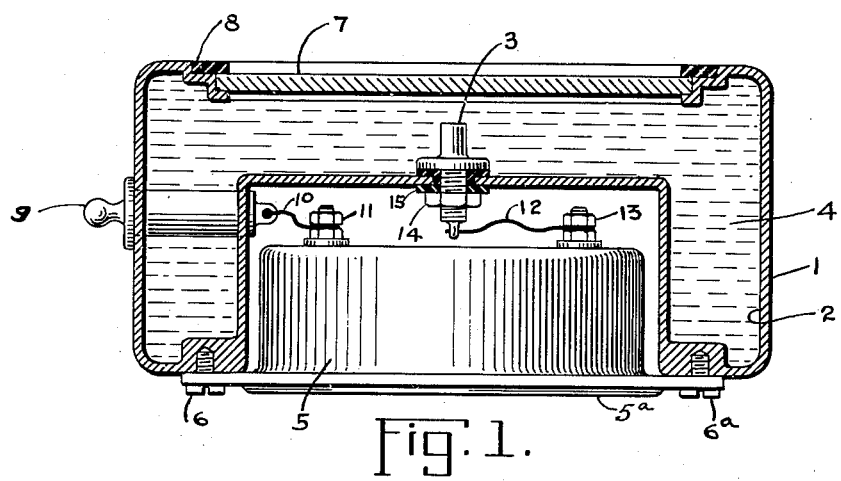
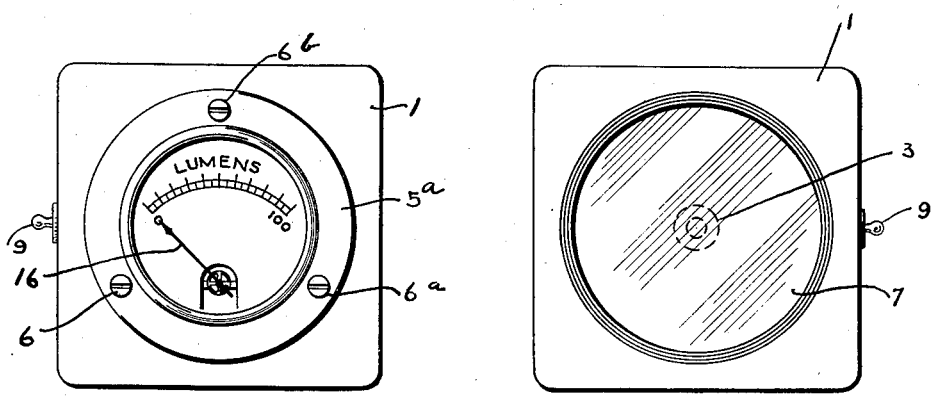
Samuel Wein
INVENTOR.
BY
H. R. Van Deventer
ATTORNEY.

Patented Oct. 28, 1930

1,779,574

UNITED STATES PATENT OFFICE

SAMUEL WEIN, OF NEW YORK, N. Y., ASSIGNOR TO RADIOVISION CORPORATION, OF NEW YORK, N. Y., A CORPORATION OF NEW YORK

DIRECT-READING PHOTOMETER

Application filed November 8, 1929. Serial No. 405,620.

This invention relates to direct reading photometers and has for its object the production of a simple and cheap photometer.

Another object is to provide a direct reading photometer wherein the user may read the results from a scale instead of having to compare the reading taken with a standard source of light, a grease spot or other standard which comparison requires skill on the part of the operator.

A further object is to utilize a light sensitive cell which will also act as a source of current supply for the indicating instrument, the readings of which will be proportional to the amount of light falling upon the cell.

Other objects will be apparent from a perusal of the following specification.

Heretofore it has been customary to compare the reading or indication obtained on a photometer with a standard. This requires skill in observation, the maintenance of accurate and often portable standards of comparison and difficulty in manipulation, all of which are avoided by the present invention.

Advantage has been taken of the fact that when light is permitted to fall on one or more plates or electrodes in a suitable electrolyte, the radiant energy sets free an electric energy between these plates.

If these electrodes are connected to a suitable electric meter, the reading thereof will be proportional to the intensity of the light it is exposed to.

This meter may have its scale graduated in foot-candles or lumens and then the instrument becomes a direct reading photometer, reading direct in foot-candles without the necessity of making any calculations or comparisons of any kind.

The meter is readily standardized by providing a light standard and marking the meter scale in accordance with the readings obtained. As the deflections obtained from the light cell are constant over a long period of time, and as the instrument is readily checked by exposing it to a standard light source, very accurate results are easily obtainable by unskilled observers.

In order to fully disclose the proper form of light sensitive cell to be used with this invention, brief reference will be made to several known types of light sensitive cells now available.

The well known selenium cell changes its electrical resistance in proportion to the light falling upon it and, if connected in series with a battery and a meter, will give a deflection proportional to the light. But such a cell does not of itself supply current and the combination not only requires a battery, but is subject to other well known difficulties inherent where selenium cells are used.

The ordinary photo-electric cell emits electrons in proportion to the light falling upon it, but a battery must be employed, and usually the output of the cell is so small that it must be amplified in order to affect the meter. This arrangement has most of the disadvantages of the selenium arrangement plus several peculiar to it plus increased cost.

The preferred cell for this photometer is of the photo-chemical type. Such a cell can be made by placing two platinum electrodes in an acidulated solution containing potassium iodide and ferric chloride. When this cell stands in the dark, ferric chloride and a certain amount of free iodine will be formed, the iodine remaining dissolved in the excess of potassium iodide. On exposing this cell to the action of light, the chemical equilibrium is displaced in the opposite direction, and potassium iodide and ferric chloride are regenerated. Now the adsorbed radiant energy is set free as electric energy in proportion to the intensity of the light falling upon the cell.

A cell having these general characteristics and hereafter termed a "photo-voltaic" cell is described in co-pending applications for patent, Serial Number 296,510 dated July 31st, 1928, and Serial Number 361,826 dated May 9, 1929. This cell is particularly suited for use in the photometer herein described but this invention is not limited to the use of this cell per se. Any cell using any metals or alloys or combination of metals and/or alloys can be used, together with any suitable electrolyte. Even inert metals can be employed with electrolytes which, when exposed to light will give rise to a potential as a result of phosphorescence or fluorescence.

By way of illustration a portable direct reading photometer embodying the invention will now be described.

The exact form herein described is shown merely for the sake of illustration and the invention can be carried out in numerous other forms and types of instruments without however departing from the appended claims.

Figure 1 is a horizontal view partly in section through a complete photometer embodying the invention.

Figure 2 is a front view of the photometer Figure 1.

Figure 3 is a rear view of the photometer Figure 1.

The numeral 1 denotes a suitable casing preferably of metal such as copper. The inside surface of this casing is coated with a film 2 of light sensitive material such as a sulphide or oxide of the same metal as the casing, or of another metal. The coating 2 may completely cover the interior of 1 or only a part thereof such as the surface adjacent the electrode 3. This coating is in effect one of the electrodes of the cell.

The electrode 3 is mounted in the insulating bushing 15 and secured therein by nut 14. The electrode 3 may be treated with light sensitive material similar to 2 if desired. If the casing is of copper, the electrode 3 may be of lead.

The electrolyte 4 is of suitable characteristics to co-operate with the electrodes 2 and 3 and their coatings to form a photo-voltaic cell and may be acid, alkaline, neutral, phosphorescent, fluorescent or radio-active.

The cell proper therefore consists of a suitable container (which may but does not of necessity form one electrode) containing two electrodes immersed in a suitable electrolyte where the container 1 is copper with a coating 2 of cuprous oxide the electrode 3 is lead and a suitable electrolyte is a one per cent solution of lead nitrate in distilled water.

Suitable indicating means such as the micro-ammeter enclosed in case 5 and having the front or dial 5ª may be placed within a recess in the casing 1 and secured thereto by screws 6, 6ª, 6ᵇ. Or this meter may be mounted upon casing 1 or on a base adjacent thereto, or supported in any manner so as to form therewith a compact portable instrument.

The casing 1 is provided with a window 7 of glass or any other substance that will permit egress of light to the interior thereof. The glass is held in place by a suitable gasket 8 or held in any suitable manner as by cement or the like to make a fluid tight chamber for the electrolyte.

The switch 9 connects the casing 1 and its coating 2 forming one electrode of the cell to terminal 11 on the meter via conductor 10. Another conductor 12 connects electrode 3 with the other terminal 13 of the meter, the cell, switch and meter being connected in series.

The details of construction of the meter mechanism are not shown as any suitable type of meter may be used. Obviously the mechanism may be mounted directly upon or within the casing 1 instead of being enclosed in a separate casing 5 as shown in Figure 1. The figure however shows a standard form of meter now in common use.

The meter 5 has a scale on the front 5ª as shown in Figure 2 graduated in lumens and calibrated by exposing the instrument to a standard source of light and comparing it with any suitable, standard photometer.

To use the photometer it is only necessary to expose the window 7 to the light it is desired to measure and observe the reading of the meter scale while switch 9 is closed.

The needle 16 of the instrument will assume a certain position on the scale 5ª proportional to the amount of light passing through window 7 and falling upon the electrodes of the cell.

The casing 1 may be entirely of glass and the coating 2 then becomes one metallic electrode and 3 the other electrode both suitably mounted within the glass cell. However the metal casing as shown is the preferred form for obvious reasons. While this description has been limited to a photometer, it is obvious the invention may be used for many other purposes such as a smoke indicator. Should a steady light be placed near the window 7, the needle 16 will assume a certain position on the scale. If smoke should pass between the light and the window, needle 16 will assume a different position. The instrument may be placed at the top of a stack with the meter in the boiler room, the meter having relay contacts to ring a bell in case of displacement of the needle from normal.

The instrument can be made to fit the pocket and is therefore easily carried and forms a portable unit instrument complete in itself. As there are no adjustments necessary and no calculations to be made, candle power readings are readily made by the unskilled.

There are no batteries to become exhausted or to give variable readings depending upon their condition. If switch 9 is left "on" it does not affect the life of the cell as this is only active in the presence of light. The switch is provided merely to open the meter circuit and bring the needle 16 to zero.

I claim:

1. A photometer consisting of a light sensitive cell constituting a source of current and visual means in circuit with said cell for indicating the current flowing, said means having a needle and a scale graduated to indicate the current flow through said meter, said cell and meter having their casings rigidly secured together to form a compact portable instrument.

2. In combination, a casing forming an electrode, a light sensitive electrode therein, electrolyte in said casing in contact therewith and with said electrode, a window in the casing adapted to permit light to enter therein, a meter mounted on said casing and electrical connections between said meter, the casing and electrodes.

3. In combination, a fluid tight casing, light sensitive electrodes therein, a window in the casing adapted to permit light to fall upon said electrodes, an electrolyte in contact with said electrodes, a recess in the casing, a meter mounted in said recess, and connections between said electrodes and meter.

4. In combination, a casing, light sensitive electrodes therein, a window in a wall of the casing adapted to admit light to the electrodes, said window and casing forming a fluid tight chamber, electrolyte within said chamber in contact with said electrodes and forming therewith a light sensitive battery and a meter adapted to measure the current output of said battery carried by said casing and connected to said electrodes.

5. In combination, a fluid tight casing, light sensitive electrodes therein, an electrolyte in contact with said electrodes, and a meter electrically connected to said electrodes and having a needle and scale adapted to indicate the current flowing when said electrodes are exposed to light.

6. In combination, a metallic casing, light sensitive electrode surfaces insulatedly supported therein, a window in the casing, a meter mounted on the casing and connected thereto and to the electrode surfaces, and an electrolyte in contact with said electrode surfaces.

7. In combination, a light sensitive cell comprising a casing, electrode surfaces rigidly supported in relation to each other and the casing, an electrolyte in contact with said electrode surfaces, and a current measuring device secured to said cell electrically connected thereto and forming therewith a portable unit instrument.

8. In combination, a photo-voltaic cell having a fluid tight casing, a depression in the casing, a meter mounted in said depression and having its face substantially flush with the surface of the casing, circuits connecting said cell and meter and a switch in series in said circuit.

9. In combination, a photo-voltaic cell having a fluid tight casing, a depression in the casing, meter mechanism including a second casing mounted in said depression said meter having a face or dial substantially flush with the outer surface of the cell casing, a window in the cell casing and connections between said cell and meter.

10. In combination, a photo-voltaic cell having a metallic casing, an electrode within the cell, a window in a wall of the casing adapted to permit light to enter the interior thereof, and a meter mounted in a depression in said casing and connected in circuit therewith and with said electrode.

11. A photometer comprising a casing, light sensitive electrodes and an electrolyte therein, a visual indicating instrument mechanically associated with said casing, and electrical connections entirely within said casing between said instrument and said electrodes.

12. A photometer comprising a casing, light sensitive electrodes and an electrolyte therein, a visual indicating instrument mechanically associated with said casing, electrical connections entirely within said casing between said instrument and said electrodes, and a switch in said electrical connections for controlling the flow of current through said indicating instrument.

13. A photo-voltaic cell having a casing, a meter having a casing, and electrical connections between said cell and said meter, said connections being entirely within said casings.

14. In a photometer as claimed in claim 13, a switch mounted in one of the casings and having its terminals enclosed therein.

15. A portable compact photometer consisting of a photo-voltaic cell comprising a container having an electrolyte and electrode surfaces therein held in fixed relation to each other and said container, a visual indicating instrument including a movable element and scale, a casing enclosing said movable element and scale, and electrical connections between said instrument and said cell.

16. A portable compact photometer consisting of a photo-voltaic cell comprising a container having an electrolyte and electrode surfaces therein held in fixed relation to each other and said container, a visual indicating instrument including a movable element and scale, a casing enclosing said movable element and scale, electrical connections between said instrument and cell, and manual switching means mounted on one of said casings controlling the circuit between said cell and indicating instrument.

In testimony whereof I affix my signature.

SAMUEL WEIN.